(12) United States Patent
Nordahl et al.

(10) Patent No.: US 9,623,328 B2
(45) Date of Patent: Apr. 18, 2017

(54) CORRELATED SENSOR SYSTEM

(75) Inventors: Mats Nordahl, Trångsund (SE); Jimmy Eiterjord, Västra Frölunda (SE)

(73) Assignee: TANGIAMO AB, Göteborg (SE)

( * ) Notice: Subject to any disclaimer, the term of this patent is extended or adjusted under 35 U.S.C. 154(b) by 480 days.

(21) Appl. No.: 13/813,523

(22) PCT Filed: Aug. 23, 2011

(86) PCT No.: PCT/EP2011/064492
§ 371 (c)(1),
(2), (4) Date: Jul. 10, 2013

(87) PCT Pub. No.: WO2012/025540
PCT Pub. Date: Mar. 1, 2012

(65) Prior Publication Data
US 2013/0285946 A1 Oct. 31, 2013

(30) Foreign Application Priority Data
Aug. 27, 2010 (EP) .................................. 10174331

(51) Int. Cl.
*G06F 3/042* (2006.01)
*A63F 13/42* (2014.01)
*A63F 13/213* (2014.01)
*G06F 3/041* (2006.01)
*G06F 3/044* (2006.01)
*G06F 3/0488* (2013.01)
*G07F 17/32* (2006.01)

(52) U.S. Cl.
CPC ............ *A63F 13/42* (2014.09); *A63F 13/213* (2014.09); *G06F 3/041* (2013.01); *G06F 3/044* (2013.01); *G06F 3/0421* (2013.01); *G06F 3/0488* (2013.01); *G07F 17/3202* (2013.01); *G07F 17/3211* (2013.01); *A63F 2300/1075* (2013.01); *G06F 2203/04104* (2013.01); *G06F 2203/04106* (2013.01); *G07F 17/322* (2013.01)

(58) Field of Classification Search
USPC ........................................................ 345/175
See application file for complete search history.

(56) References Cited

U.S. PATENT DOCUMENTS

| | | | |
|---|---|---|---|
| 6,573,883 B1 | 6/2003 | Bartlett | |
| 2007/0177803 A1 | 8/2007 | Elias et al. | |
| 2010/0079384 A1 | 4/2010 | Grivna | |
| 2011/0175809 A1* | 7/2011 | Markovic et al. | ............ 345/158 |

FOREIGN PATENT DOCUMENTS

| | | |
|---|---|---|
| EP | 2105824 A1 | 9/2009 |
| WO | WO-2008136551 A1 | 11/2008 |

OTHER PUBLICATIONS

Christopher, RJ et al. "Touch Screen With Combined Force and Position Sensing"; Jun. 1, 1989; IP.com No. IPCOM000037765D.
International Search Report for PCT/EP2011/064492 dated Dec. 30, 2011.

* cited by examiner

*Primary Examiner* — Gustavo Polo
(74) *Attorney, Agent, or Firm* — Remarck Law Group PLC

(57) ABSTRACT

A system for controlling a display screen using manually generated movement of a user. The system includes a first and a second sensor arrangement being different from each other and used for forming a combined and correlated set of sensor data. The correlated parameters are matched to a code book and thereafter used for controlling the display screen. A method and computer program are also disclosed for controlling a display screen.

13 Claims, 3 Drawing Sheets

CORRELATED SENSOR SYSTEM

FIELD OF THE INVENTION

The present invention relates to a sensor system usable for controlling movement on a display screen. The present invention also relates to a corresponding method and computer program for controlling movement on a display screen.

DESCRIPTION OF THE RELATED ART

Computer pointing devices, such as a computer mouse, are among the most popular devices for interfacing with a computer and for controlling the movement of a cursor on a display screen connected to the computer. Generally, the position of the cursor on the display screen is directly controlled by the user by moving the mouse in two dimensions on a flat surface. Movements of the mouse correspond to the two dimensional motion of the cursor on the screen.

There is however a general trend towards the use display screens with touch screen capability, allowing for further functionality to the connected computer by for example using gesture detection based on fingers moving over the touch screen according to a predetermined pattern. The simultaneous use of more than one finger is often referred to as multi-touch.

An example of a method and computer system using multi-touch functionality is disclosed in US 2007/0177803, making use of a multi-touch dictionary for identifying the specific gesture provided by a user moving his/her hands over the touch screen. However, even though the method and computer system according to US 2007/0177803 provides improvements in relation to extension of the functionality that possibly may be provided by the computer/touch screen combination using multi-touch, it is always desirable to provide further improvements, for example in relation to the detection of a users hand/finger moving over the touch screen, and possibly also when a plurality of simultaneous multi-touch users uses a single computer/touch screen.

SUMMARY OF THE INVENTION

According to an aspect of the invention, the above may at least partly be met by system for controlling a display screen using manually generated movement of a user, the system comprising a first set of sensors forming a first sensor arrangement, a second set of sensors forming a second sensor arrangement, the second set of sensors being different than the first set of sensors, and a control unit being electrically connected to the first and the second sensor arrangement, wherein the first and the second sensor arrangements are arranged adjacently to the display screen for detecting the movement and the control unit may be configured to receive a first set of sensor data from the first sensor arrangement, receive a second set of sensor data from the second sensor arrangement, form a combined set of sensor data by combining the first and the second set of sensor data, determine a best match for the combined set of sensor data from a plurality of predetermined movement patterns, and control the display screen based on the best matching movement pattern.

The present invention is based on the understanding that it may be possible to improve detection of user generated movement on a display screen by comparing a correlated stream of sensor data from a plurality of sensor arrangements (i.e. at least two) with a "code book" comprising a plurality of predetermined movement patterns (e.g. stored sensor data streams having a "specific meaning"). The best match of the code book may then be used for controlling the display screen, e.g. a graphical user interface being shown on the display screen, or for generating a computer command for example executing a specific function of a computer. Accordingly, instead of relying on X and Y coordinates having to first be determined for a specific position on the display screen, the stream of raw sensor data from at least two different sensor arrangements may be used to complement each other to directly determine a desire of the user touching the display screen. This may result in a faster and more intuitive control of the display screen, and also allowing for quick input of complex commands to e.g. a computer being controlled by the system according to the invention. For example, the gesture provided by the person may be determined based on the raw data without having to go through a complicated process of e.g. determining the position of all five fingers of a user touching the display screen.

Advantageously, the code book may be trained to comprise numerous different movement patterns, for example allowing for multi-touch for detecting more than one finger of the user. The code book may also be trained to comprise commands relating to different types of object used for generating the movement, i.e. not only the fingers of the user but e.g. possibly also different objects such as a stylus, and/or comprising information as to different movement patterns created depending on with what pressure the users finger(s) are being pressed towards the display screen.

In an embodiment of the invention, at least one of the first and the second sets of sensors are selected from a group comprising optical, IR, ultrasound, capacitive and resistive sensors. Additional sensor types, present and future are of course possible and within the scope of the invention. Advantageously, the system may be configured for determining best matching movements for a plurality of users, and further comprises a third sensor arrangement for detecting each of the plurality of users. The information from the third sensor arrangement may preferably be combined with the information from (at least one of) the first and the second sensor arrangements for providing the combined set of sensor data.

The system as discussed above may also form part of for example a gaming arrangement for controlling a game, the arrangement comprising a graphical user interface relating to the game being shown on a display screen. In such an embodiment the graphical user interface may be controlled by the system. Another example where the system may be included is with a mobile electronic device, such as a mobile phone of a PDA comprising a display screen, where the system may be used for controlling the display screen.

According to another aspect of the invention, there may be provided a method for controlling a display screen using manually generated movement of a user, the method comprising the steps of receiving a first set of sensor data from a first sensor arrangement comprising a first set of sensors, receiving a second set of sensor data from a second sensor arrangement comprising a second set of sensors, the second set of sensors being different than the first set of sensors, wherein the first and the second sensor arrangements are arranged adjacently to the display screen for detecting the movement, forming a combined set of sensor data by combining the first and the second set of sensor data, determining a best match for the combined set of sensor data from a plurality of predetermined movement patterns, and controlling the display screen based on the best matching movement pattern. This aspect of the invention provides similar advantages as according to the earlier mentioned aspect.

According to still another aspect of the invention, there may provided a computer program product comprising a computer readable medium having stored thereon computer program means for causing a control unit to provide a display control operation, wherein the computer program product comprises code for receiving a first set of sensor data from a first sensor arrangement comprising a first set of sensors, code for receiving a second set of sensor data from a second sensor arrangement comprising a second set of sensors, the second set of sensors being different than the first set of sensors, wherein the first and the second sensor arrangements are arranged adjacently to the display screen for detecting the movement, code for forming a combined set of sensor data by combining the first and the second set of sensor data, code for determining a best match for the combined set of sensor data from a plurality of predetermined movement patterns, and code for controlling the display screen based on the best matching movement pattern. Also this aspect of the invention provides similar advantages as according to the earlier mentioned aspects.

The control unit is preferably a micro processor, possibly integrated in e.g. a computer, a mobile phone, a PDA or a similar device, and the computer readable medium may be one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realizes that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION OF CURRENTLY PREFERRED EMBODIMENTS

Figure 1A:
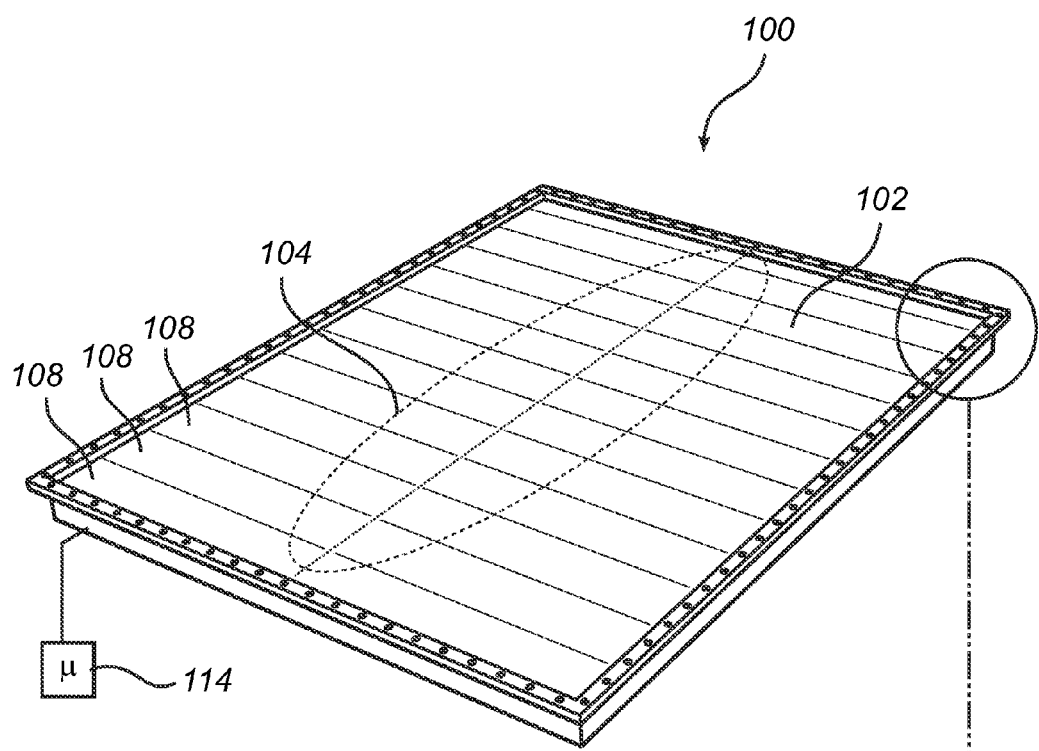
FIGS. 1a and 1b illustrates an embodiment of a system according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1B:
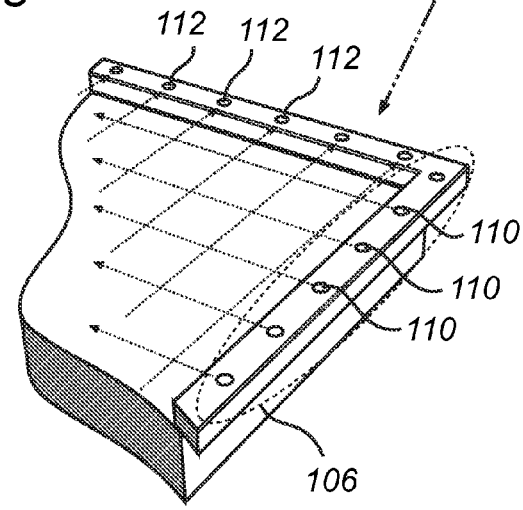

Referring now to the drawings and to FIGS. 1a and 1b in particular, there is depicted a conceptual view of a system 100 according to a currently preferred embodiment of the invention. The system 100 comprises a display screen 102 to be controlled by manual movement of for example a users hand on or adjacently to the display screen 100. In normal operation, the display screen 102 may show a graphical user interface (GUI) and input to the GUI may be desired, as mentioned e.g. using a users hand/object on or adjacently to the display screen.

The system 100 further comprises a first 104 and a second 106 set of sensor arrangement being of different types and arranged adjacently to the display screen 102. The first sensor arrangement (shown in FIG. 1a) is of the capacitive type and comprises a plurality of insulated capacitive sections 108 distributed over the display screen 102. Preferably, each of the sections 108 only covers a small portion of the display screen 102 while still being readily accessible at the edges of the display screen. During operation, a small current (optionally of a high frequency) is transferred trough e.g. the users hand and through the capacitive section 108 such that the specific capacitive section that is being touched by the user may be detected.

The second sensor arrangement 106 is in the illustrated embodiment (as shown in FIG. 1b) of the light emissive type, for example using transmitting IR diodes 110 and receiving IR sensors 112. The IR diodes 110 may for example be positioned slightly above the surface of the display screen 102 and pointing from one edge towards the opposite edge of the display screen where the receiving IR sensors 112 may be positioned. Thus, during operation of the second sensor arrangement 106, the each of the IR diodes 110 are transmitting a beam of light to a dedicated "opposite" IR sensor 112. If a user moves e.g. a hand or any other object towards the display screen 102 such that the beam of light is broken, this is detected by one or a plurality of IR sensors 112 not receiving the beam of light. The light from the different IR diodes 110 may be frequency modulated and separated in time, i.e. by allowing the different IR diodes 110 to sequentially transmit a beam of light towards the respective IR sensors 112. Additionally, each of the (e.g. four) edges of the display screen 102 may be equipped with both IR diodes 110 and IR sensors 112, where the diodes 110 and sensors 112 are slightly shifted and arranged to spatially correspond in position to an opposite edge of the display screen, i.e. diode-sensor.

Additionally, the system 100 also comprises a control unit 114 adapted to receive the e.g. continuous stream of sensor data from the first 104 and the second 106 sensor arrangement. The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Other types of sensor arrangements may of course be used together with or instead of the first (capacitive) 104 and second (IR light) 106 sensor arrangement. Such types of sensor arrangements may for example comprise a plurality of ultrasound and/or capacitive sensors.

Figure 2:
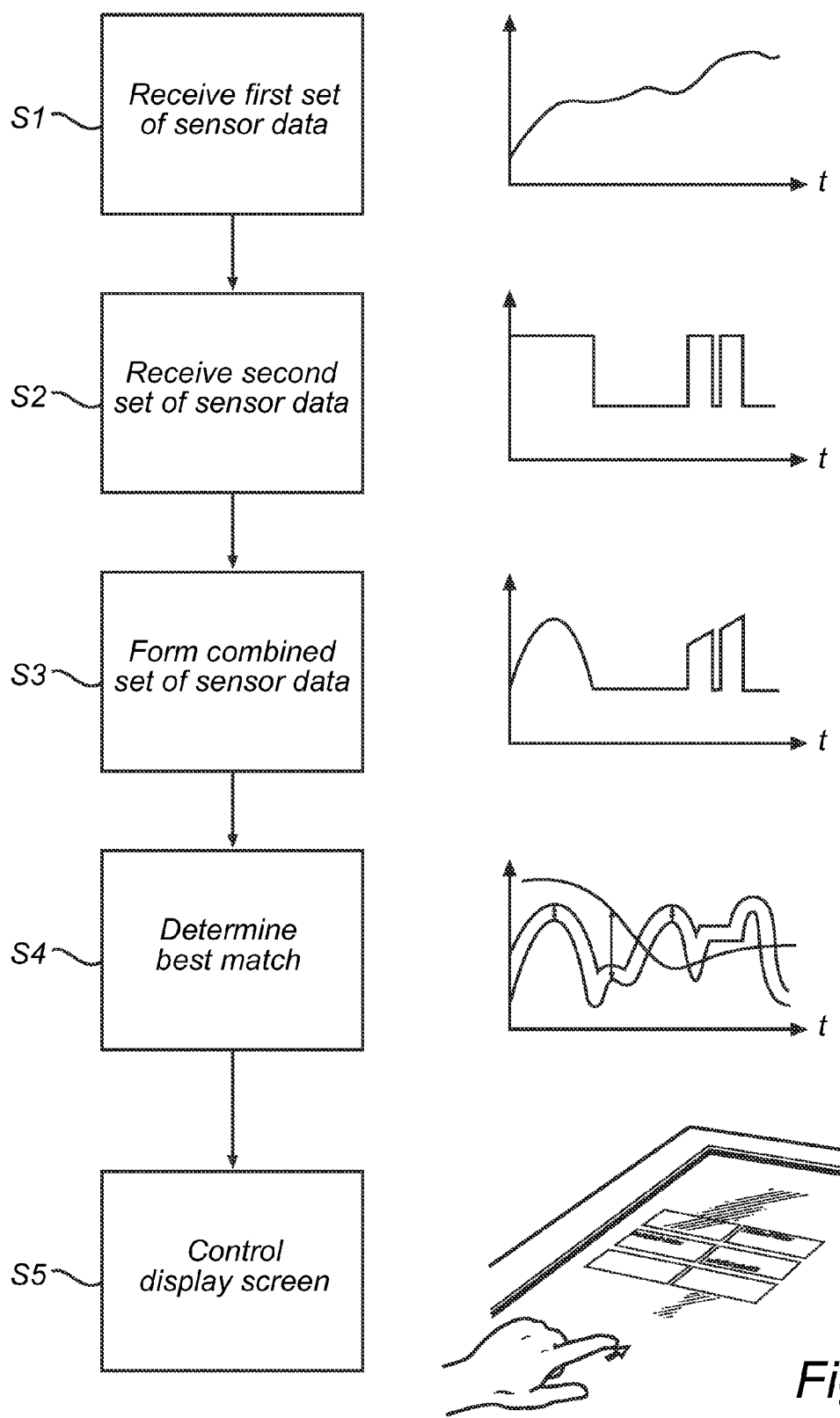
FIG. 2 is a flow chart illustrating exemplary processing steps performed by a control unit comprised with the system.

During operation of the system 100, with reference to FIG. 2, the process starts in step S1 where the control unit 114 receives sensor data from the first sensor arrangement 104. The sensor data from the first sensor arrangement may e.g. be in the form of a multi dimensional and sampled data vector, where each of the different sensors 108 of the first sensor arrangement 104 provides one dimension of the data vector. Similarly, in step S2, the control unit 114 receives a stream of sensor data from the sensors 112 of the second sensor arrangement 106, possibly also provided as a similar multi dimensional data vector.

It should be noted that the time factor of the sampling of the stream of sensor data from both the first 104 and the second sensor 106 arrangement may be taken into account, stored and used during operation of the system 100.

In step S3, the stream of sensor data from the first sensor arrangement 104 is combined/correlated with the stream of sensor data from the second sensor arrangement 106. The resulting "combined stream of sensor data" is then compared with a plurality of predetermined movement patterns, e.g. stored in a code book. In step S4 it is then determined the best match with the content of the code book. The content of the code book may be provided by "teaching" the system 100 different movement patterns, e.g. by executing different "movement scenarios" on the display screen using different objects adjacently to the display screen as well as touching/pressing against the display screen with different force, e.g. resulting in that different pressure patterns may be detected by the system 100.

Different types of multi dimensional matching algorithms may be used depending on the type of sensors used and the sensor data provided by the sensors. In one embodiment a simple time/amplitude mean square error (MSE) comparison algorithm may be applied. However, for example more complicated statistical and/or multi dimensional frequency base algorithms may be applied. Furthermore, the comparison may be location specific (i.e. depending on where on the display screen 102 the movement pattern is detected) or may be generic, e.g. allowing for location independent as well as scale invariant comparison. That is, a specific movement pattern may be acted out both in a small as well as in a large area of the display screen with the same end result.

Additionally, the movement pattern created by the user may be a movement pattern created by more than one user, for example two or more users. As such, the different sensor arrangements may detect different users providing different movement pattern, combine the patterns and match the combined multi-user movement pattern with a corresponding multi-user movement pattern stored in the code book. In the other way around, for example different detected pressure being applied by different users touching the display screen 102 may be used for separating different users from each other. This may also be combined with spatial/time related information, e.g. one user may not be able to touch opposite edges of the display screen within a short time span if the display screen 102 is large enough.

Finally, in step S5 the best matching result of the comparison, having a connection to e.g. a specific computer command/macro, is used for controlling for the display screen 102 and eventually for example a GUI being shown on the display screen 102.

Figure 3:
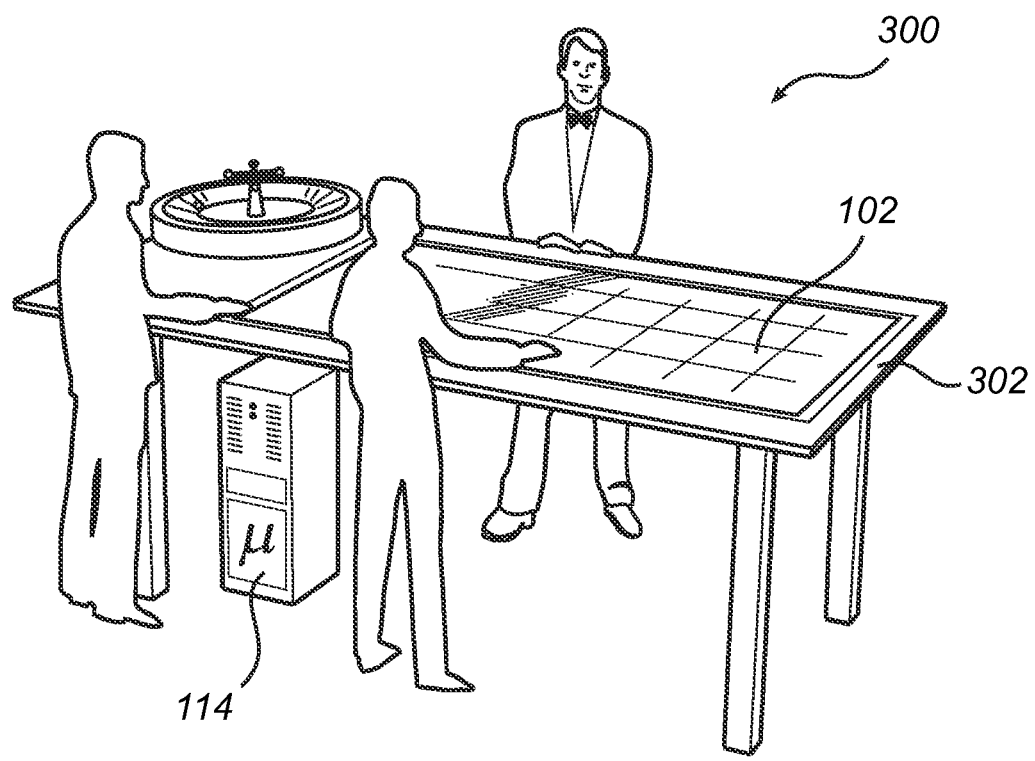
FIG. 3 shows a gaming arrangement comprising a system according to the invention.

Turning now to FIG. 3 which illustrates a conceptual gaming arrangement 300, comprising gaming table 302 including a graphical multi-touch user interface being shown on the display screen 102 for one or a plurality of players playing a game (such as in the illustrated embodiment the game of Roulette, even though other types of games are possible and within the scope of the invention) and placing bets. The display screen 102 may for example be a dynamically configurable display, such as an LCD panel, connected to the control unit 114 for handling bets provided by the players.

For allowing the different players to place bets, the system 100 according to the invention may be applied, for examples together with additional sensors for differentiate the different players from each other. Such identification means may comprise a multitude of sensors, and the results captured by the sensor may in turn be correlated for determining the identity of the user. As discussed above, also the differentiating between the different players may also be provided, at least in part, by the system 100.

The system 100 according to the invention may furthermore be integrated with any electronic device having use of touch control user interface in relation to a display screen. Such devices include for example PDAs, mobile phones, net books, etc. Additionally, as the system 100 may be configured to be used for multi-user detection where the users may work independently of or together with each other, the system 100 may advantageously be used with large display screens to e.g. control a complex multi-user graphical interface.

In summary, the present invention relates to a system for controlling a display screen using manually generated movement of a user. The system comprises a first and a second sensor arrangement being different from each other and used for forming a combined and correlated set of sensor data. The correlated parameters are matched to a code book and thereafter used for controlling the display screen.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A system for controlling a display screen using manually generated movement of a user, the system comprising:
   a first set of sensors forming a first sensor arrangement;
   a second set of sensors forming a second sensor arrangement, the second set of sensors being of a different type than the first set of sensors; and
   a control unit being electrically connected to the first and the second sensor arrangement, wherein the first and the second sensor arrangements are arranged adjacently to the display screen for detecting the movement, and wherein the second set of sensors are arranged at the edge of the display screen and pointing from said edge towards the opposing edge of the display screen, and the control unit is configured to:
      receive a first set of sensor data from the first sensor arrangement;
      receive a second set of sensor data from the second sensor arrangement;
      form a combined set of sensor data by combining the first and the second set of sensor data;
      determine a best match for the combined set of sensor data from a plurality of predetermined movement patterns; and
      control the display screen based on the best matching movement pattern.

2. System according to claim 1, wherein at least one of the first and the second sets of sensors are selected from a group comprising optical, IR, ultrasound, capacitive and resistive sensors.

3. System according to claim 1, further comprising the display screen.

4. System according to claim 1, wherein the system is configured for determining best matching hand movements for a plurality of users, and further comprises a third sensor arrangement for detecting each of the plurality of users.

5. System according to claim 4, wherein the control unit is further configured to receive a third set of sensor data from the third sensor arrangement and the combined set of sensor data is formed by combining the first, the second and the third set of sensor data.

6. System according to claim 1, wherein the control unit is further configured to generate a computer command corresponding to the best matching movement pattern.

7. System according to claim 1, wherein the sensors of at least one of the first or the second sensor arrangements are spatially distributed along the edges of the display screen.

8. System according to claim 1, wherein the plurality of predetermined movement patterns comprises comparison data relating to a plurality of different objects used for generating the movement patterns on the display screen.

9. Gaming arrangement for controlling a game, the arrangement comprising a graphical user interface relating to the game being shown on a display screen and a system according to claim 1 for controlling the graphical user interface.

10. Gaming arrangement according to claim 9, further comprising a multi-user gaming interface.

11. Gaming arrangement according to claim 10, wherein multi-user gaming interface further comprises means for individual identification of the plurality of users.

12. Mobile electronic device comprising a display screen and a system according to claim 1 for controlling the display screen.

13. A method for controlling a display screen using manually generated movement of a user, the method comprising:
    receiving a first set of sensor data from a first sensor arrangement comprising a first set of sensors;
    receiving a second set of sensor data from a second sensor arrangement comprising a second set of sensors, the second set of sensors being of a different type than the first set of sensors, wherein the first and the second sensor arrangements are arranged adjacently to the display screen for detecting the movement, and wherein the second set of sensors are arranged at the edge of the display screen and pointing from said edge towards the opposing edge of the display screen;
    forming a combined set of sensor data by combining the first and the second set of sensor data;
    determining a best match for the combined set of sensor data from a plurality of predetermined movement patterns; and
    controlling the display screen based on the best matching movement pattern.

* * * * *